United States Patent
Swain et al.

(10) Patent No.: US 8,461,884 B2
(45) Date of Patent: Jun. 11, 2013

(54) PROGRAMMABLE DELAY CIRCUIT PROVIDING FOR A WIDE SPAN OF DELAYS

(75) Inventors: Jyotirmaya Swain, Bangalore (IN); Utpal Barman, Bangalore (IN); Adarsh Kalliat, Bangalore (IN); Raji Cherian, Bangalore (IN); Edward L Riegelsberger, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 139 days.

(21) Appl. No.: 12/189,823

(22) Filed: Aug. 12, 2008

(65) Prior Publication Data
US 2010/0039149 A1    Feb. 18, 2010

(51) Int. Cl.
*H03L 7/06* (2006.01)

(52) U.S. Cl.
USPC ............ 327/149; 327/141; 327/147; 327/150

(58) Field of Classification Search
USPC ...... 327/141, 144–163, 231–290; 331/15–17; 375/373–376; 32/141, 144–163, 231–290
See application file for complete search history.

(56) References Cited

U.S. PATENT DOCUMENTS

| | | | |
|---|---|---|---|
| 5,023,776 A | 6/1991 | Gregor | |
| 5,640,366 A | 6/1997 | Majos et al. | |
| 5,809,514 A | 9/1998 | Nasserbakht et al. | |
| 6,006,339 A | 12/1999 | McClure | |
| 6,167,528 A | 12/2000 | Arcoleo | |
| 6,236,251 B1 * | 5/2001 | Akamatsu | 327/144 |
| 6,370,067 B1 | 4/2002 | Ko et al. | |
| 6,480,946 B1 | 11/2002 | Tomishima et al. | |
| 6,516,362 B1 | 2/2003 | Magro et al. | |
| 6,516,635 B1 | 2/2003 | Yang et al. | |
| 6,603,694 B1 | 8/2003 | Frankowsky et al. | |
| 6,615,345 B1 | 9/2003 | LaBerge | |
| 6,665,231 B2 | 12/2003 | Mizuno et al. | |
| 6,738,918 B2 | 5/2004 | Toda | |
| 6,889,335 B2 * | 5/2005 | Hargis et al. | 713/502 |
| 7,343,533 B2 | 3/2008 | Lee et al. | |
| 7,385,861 B1 | 6/2008 | Zhu | |
| 7,392,465 B2 | 6/2008 | Azimane et al. | |
| 7,796,465 B2 | 9/2010 | Swain et al. | |
| 7,808,849 B2 | 10/2010 | Swain et al. | |
| 2002/0040454 A1 | 4/2002 | Raad et al. | |
| 2002/0184461 A1 | 12/2002 | Zumkehr | |
| 2003/0198311 A1 * | 10/2003 | Song et al. | 375/376 |
| 2004/0104749 A1 | 6/2004 | Yeh | |
| 2005/0135167 A1 | 6/2005 | Manabe | |

(Continued)

OTHER PUBLICATIONS

"JEDEC Standard", "DDR3 SDRAM Specification", date: Sep. 2007, pp. 1-189.

*Primary Examiner* — Lincoln Donovan
*Assistant Examiner* — Brandon S Cole

(57) ABSTRACT

According to an aspect of the present invention, one of multiple clock signals of different relative phases is selected based on a desired delay magnitude, and the digital values received on an input signal are then synchronized to an edge ("first edge") of the selected clock signal to provide the digital values with the desired delay magnitude. In an embodiment, the selected clock signal can be delayed by a fine value (less than the minimum phase difference of the multiple clock signals) to provide a wide span of desired delays. An aspect of the invention provides for a synchronization circuit with reduced latency and which is substantially invariant to process, voltage and temperature (PVT) changes.

20 Claims, 6 Drawing Sheets

U.S. PATENT DOCUMENTS

| | | |
|---|---|---|
| 2005/0182993 A1 | 8/2005 | Okawa et al. |
| 2006/0041799 A1 | 2/2006 | Sato |
| 2006/0245531 A1* | 11/2006 | Leonowich et al. .......... 375/376 |
| 2006/0256205 A1* | 11/2006 | Kim et al. .................. 348/222.1 |
| 2007/0008791 A1 | 1/2007 | Butt et al. |
| 2008/0238516 A1* | 10/2008 | Iorga ............................. 327/287 |

\* cited by examiner

PROGRAMMABLE DELAY CIRCUIT PROVIDING FOR A WIDE SPAN OF DELAYS

BACKGROUND

1. Technical Field

The present disclosure relates to delay circuits and more specifically to a programmable delay circuit suitable for delaying high speed signals.

2. Related Art

Delay circuits are often used to delay a sequence of digital values of interest. The magnitude ("delay magnitude") by which a signal is delayed can be specified from external sources (e.g., by a user or other portion of the circuit), and a corresponding delay circuit is referred to as a programmable delay circuit. The potential delay magnitudes, including the minimum, maximum and intermediate values, defines the span of delays provided by the delay circuit.

According to a prior approach, the delay circuits are implemented as a chain of combinational elements and a multiplexor selects the signal from the output of one of the combinational elements as the delayed signal depending on the desired delay magnitude.

Such an approach may require a large number of combinational elements to provide a large span of delays and may be unsuitable for several reasons. For example, the approach may require corresponding additional circuitry (often measured as number of gates required) to implement the combinational elements, and space constraints on the die (on which the delay circuit is fabricated) may make such requirement undesirable.

Further, the large number of components may introduce jitter, which is also undesirable. An additional disadvantage of such an approach is that the delay portion introduced by each of the combinational elements may vary depending on the changes in process, voltage and temperature (PVT), and accordingly the delay provided by the delay circuit may also vary widely with PVT.

Several aspects of the present invention provide a programmable delay circuit overcoming one or more of the disadvantages noted above.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

According to an aspect of the present invention, one of multiple clock signals of different relative phases is selected based on a desired delay magnitude, and a sequence of digital values received on an input path are then synchronized to an edge ("first edge") of the selected clock signal to provide the digital values with the desired delay magnitude.

In an embodiment, the selected clock signal can be delayed by a fine value (less than the minimum phase difference of the multiple clock signals) to provide a wide span of desired delays.

Another aspect of the present invention provides for a synchronization circuit with reduced latency and which is at least substantially invariant to process, voltage and temperature changes.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Programmable Delay Circuit

Figure 1:
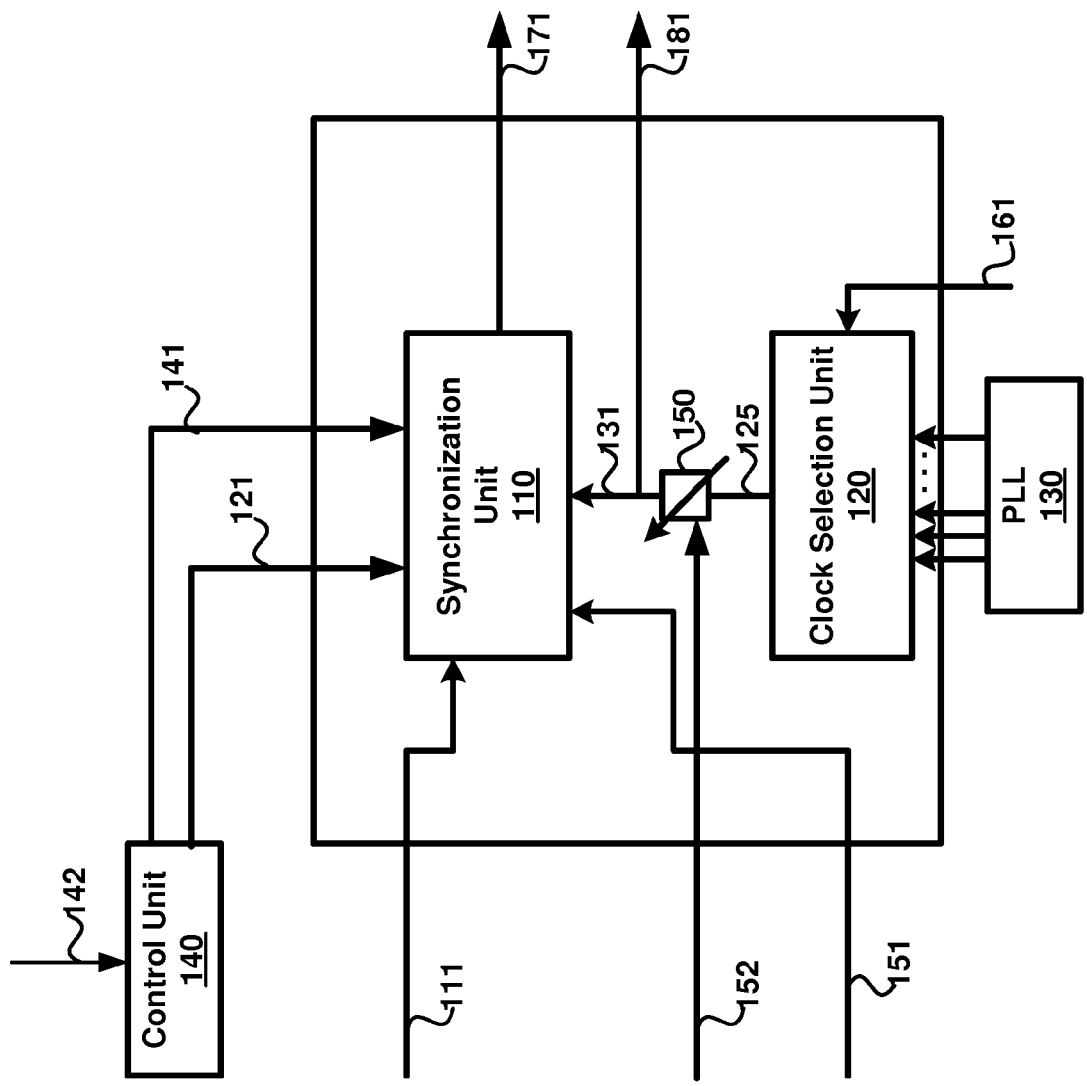
FIG. 1 is a block diagram of a programmable delay circuit in which several aspects of the present invention can be implemented.

FIG. 1 is a block diagram illustrating the details of programmable delay circuit in an embodiment of the present invention. The programmable delay circuit is shown to contain clock selection block 120, synchronization circuit 110, PLL 130, control unit 140 and fine tuning circuit 150. Each block is described below in further detail.

PLL 130 generates different clock signals, with each clock signal having the same frequency as input clock 151, but with a different relative phase delay. For example, assuming that eight clock signals are generated by PLL 130 with a period P, each of the clock signals may be generated with the same frequency, but delayed by P/8 compared to another clock signal. P/8 represents the relative phase of each clock signal compared to the one with the closest phase. It should be appreciated that the clock signals, which are invariant to PVT conditions, can be generated using one of several well known approaches.

Clock selection unit 120 selects one of the clock signals received from PLL 130 and provides the selected signal on path 125. The specific clock signal selected is determined by a select value received on path 161. Clock selection unit 120 may thus be implemented as a multiplexor selecting the specific clock signal specified by the select value.

Fine tuning circuit 150 delays the clock signal received on path 125 by a magnitude determined by a fine value received on path 152. Clock signal 131, thus provided, is referred to as a delayed clock signal and may also be viewed as the selected clocks signal delayed by the fine magnitude. Fine tuning circuit 150 may contain combinational elements, which may make the delays dependent on PVT conditions. However, the variations may be minimal due to the small delay sought to be introduced. In an embodiment, the maximum magnitude by which the signal is delayed, equals the relative phase delay (P/8 in the illustrative example of above) with which the clock signals are generated by PLL 130.

Control unit 140 receives a desired delay magnitude on path 142 and controls the operation of the remaining components to delay the digital values by that magnitude. In an embodiment described in detail below, control unit 140 controls the values on paths 161, 141 121, and 152 (though some of the connections are not shown) to cause the digital values received on path 111 to be delayed by the desired magnitude, which can be in a range of 0.25-1.5 periods of the input clock signal 151.

Synchronization circuit 110 receives a sequence of digital values on path 111 at time instances defined by input clock 151, and provides each value aligned with an edge of the clock signal received on path 131.

In an embodiment, synchronization circuit 110 is implemented as an asynchronous FIFO, clocked by the delayed clock signal 131 while receiving the digital values on a data input. The output of the asynchronous FIFO represents the sequence of digital values delayed by the desired amount. One problem with such an implementation is that the solution may have a high latency.

An aspect of the present invention provides a low latency synchronization circuit which provides for a wider span of delay magnitudes also as described below in further detail.

3. Low Latency Synchronizer Circuit

Figure 2:
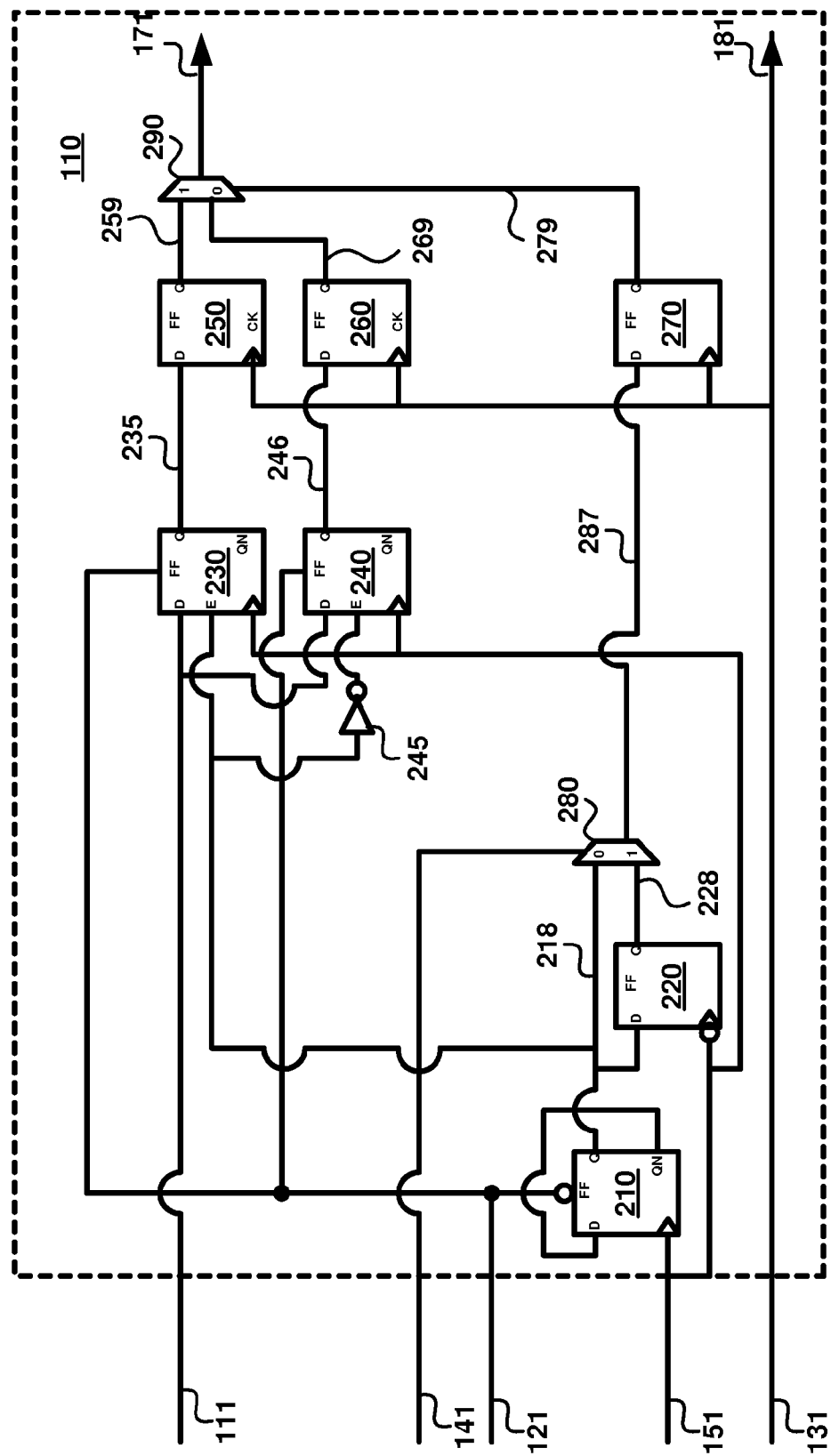
FIG. 2 is a bock diagram of the synchronization circuit which provides the necessary edge alignment in an embodiment of the present invention.

FIG. 2 is circuit diagram illustrating the details of a synchronization circuit in one embodiment. Synchronizer circuit 110 is shown containing FFs (delay flip-flops) 210, 220, 230, 240, 250, 260 and 270, inverter 245 and multiplexors 280 and 290.

FF 210 operates to provide (on Q output) clock signal 218 having half the frequency of input clock signals 151, with the rising edge of clock signal 218 coinciding with every alternate rising edge of the clock input 151. To provide such an output signal, FF 210 is clocked by input clock signal 151 and the inverted output (QN) of FF 210 is fed back to the data input (D). Signal 121 resets the operation of FFs 210, 230 and 240 and is asserted by control unit 140 during initialization phases (e.g., during power up).

FF 220 operates to provide (on Q output) clock signal 228, which is clock signal 218 delayed by ¼ clock period of signal 218 (also ½ clock period of the input clock signal 151). To provide such an output, FF 220 is clocked by inverted version of clock signal 151 and the D input is connected to receive clock signal 228.

Multiplexor 280 selects clock signal 218 in response to a value of 0 on select input 141, and clock signal 228 in response to a value of 1 on select input 141. As will be clear from the description below, the specific values of 0 and 1 are designed to avoid various meta-stability issues within the various flop-flops (by providing sufficient hold time), in addition to facilitating a wider span of desired delay values.

Flip-flops 230 and 240 operate to receive alternative ones of the sequence of digital values received on path 111. To achieve such a feature, both flip-flops 230 and 240 are shown receiving data input 111 on the respective D input, but have the enable input coupled to normal and inverted versions of signal 218 respectively. Thus, the flip-flops are enabled in alternate cycles of input clock signal 151 and operate to store each sample for two cycles in input clock signal 151.

FF 250 and FF 260 operate to receive the digital values from FFs 230 and 240 respectively, at time instances specified by delayed clock signal 131. Thus, assuming a (immediately preceding) digital value is stored in FF 230, the value would be received by FF 250 with a delay equaling the relative delay of signal 131 compared to input clock signal 151. The same statement holds with respect to FF 260 if an immediately preceding digital value is received by FF 240. While one FF 250 or 260 receives a digital value corresponding to the present clock cycle of delayed clock signal 131, the digital value corresponding to the previous clock cycle is stored in the other FF.

Multiplexor 290 selects the digital value from one of the two FFs 250 and 260 depending on the value present on path 279. FF 270 provides a specific value on select path 279 to determine whether the digital value corresponding to which of the two FFs 250/260 is selected.

The operation of the circuit of FIG. 2 is clarified further with respect to the timing diagrams of FIGS. 3-6. In the diagrams, each data element/value is delayed by a minimum duration of 0.25 period (of the input clock signal), and accordingly a desired delay magnitude of X translates to an actual delay magnitude of (X+0.25 period). The 0.25 period ensures guaranteed setup margin between the flip-flops to avoid various meta-stability problems.

In addition, the operation of the circuit can be understood based on four cases, when the desired delay in between—(A) 0.00-0.50 periods; (B) 0.50-0.75 periods with path 141 asserted to 0; (C) 0.50-0.75 periods with path 141 asserted to 1; and (D) 0.75-1.25 periods. The operation in the corresponding four situations is described below with FIGS. 3-6 respectively.

4. Timing Diagrams

Figure 3:
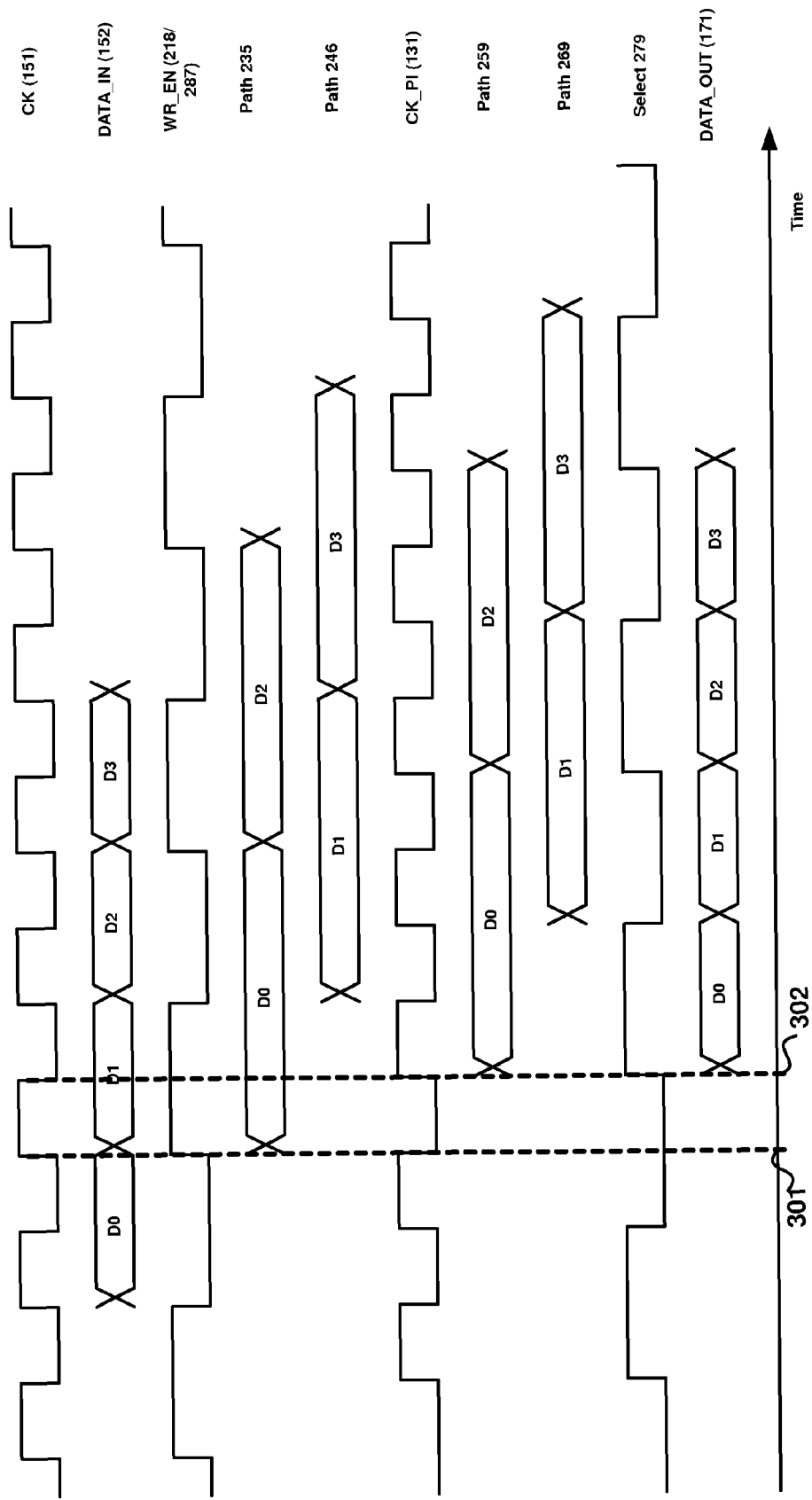
FIG. 3 is a timing diagram illustrating the manner in which 0.25 period (of the input clock signal) of desired delay magnitude is generated in an embodiment.

FIG. 3 is a timing diagram illustrating the timing relationship of various signals when the desired delay magnitude equals 0.25 periods (corresponding to an actual delay period of 0.5 Period shown by time instances 301 and 302 of the input clock 151). In this scenario, control unit 140 causes a clock signal with a phase delay of 0.5 (compared to input clock signal 151) to be selected, while asserting path 141 to 0. Each of the signals is shown with the corresponding reference number of FIG. 2 and the relevant portions of the signals are described briefly below.

Delayed clock signal 131 is shown delayed half a clock cycle in comparison to input clock signal 151. Clock signal 287 is shown with half the frequency of input clock signal 151 and in phase with input clock signal 151 since value on path 141 is 0 (as set by control unit 140). The data_in (152) is shown received at the rising (one direction) edge of input clock signal CK 151.

Path 152 is shown receiving digital values D0-D3 according to input clock signal 151. Alternate digital values are shown stored in FFs 230 and 240 according to input clock signal 151 as represented by signals 235 and 246. The values in FFs 230 and 240 are shown transferred to FFs 250 and 260 according to delayed clock signal 131 as represented by signals on paths 259 and 269.

The value on path 279 is shown transitioning according to delayed clock signal 131. It may accordingly be observed that each of the digital values is delayed by 0.5 clock cycles (corresponding to a desired delay magnitude of 0.25 period).

Figure 4:
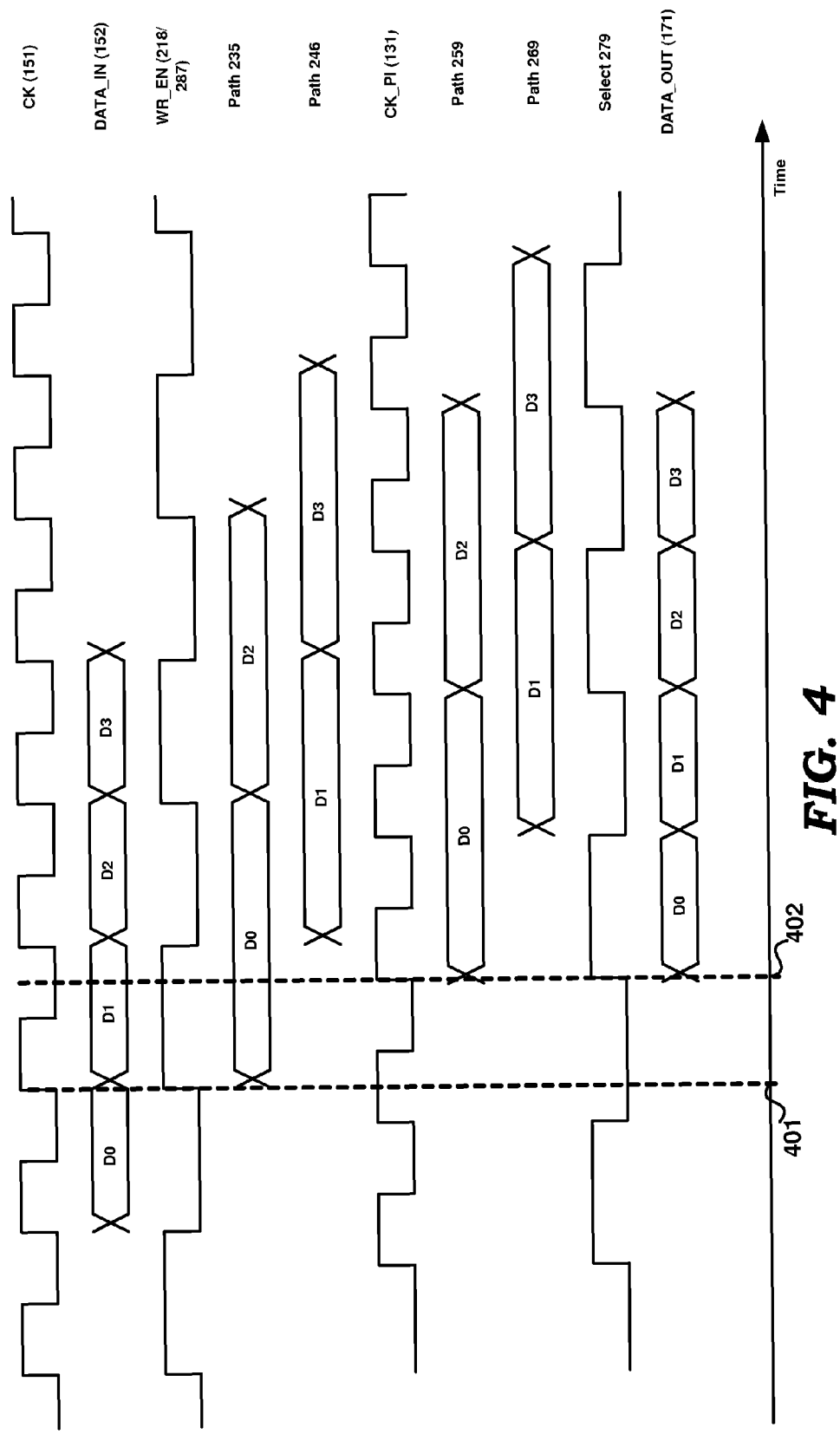
FIG. 4 is a timing diagram illustrating the manner in which 0.5 period of delay is generated in an embodiment.

FIG. 4 is a timing diagram illustrating the timing relationship of various signals when the desired delay magnitude equals 0.5 periods (corresponding to an actual delay period of 0.75 Period shown by time instances 401 and 402 of the input clock 151). In this scenario, control unit 140 causes a clock signal with a phase delay of 0.75 (compared to input clock signal 151) to be selected, while asserting path 141 to 0. As path 141 is asserted to 0, flip-flop 270 samples the signal on path 218.

Figure 5:
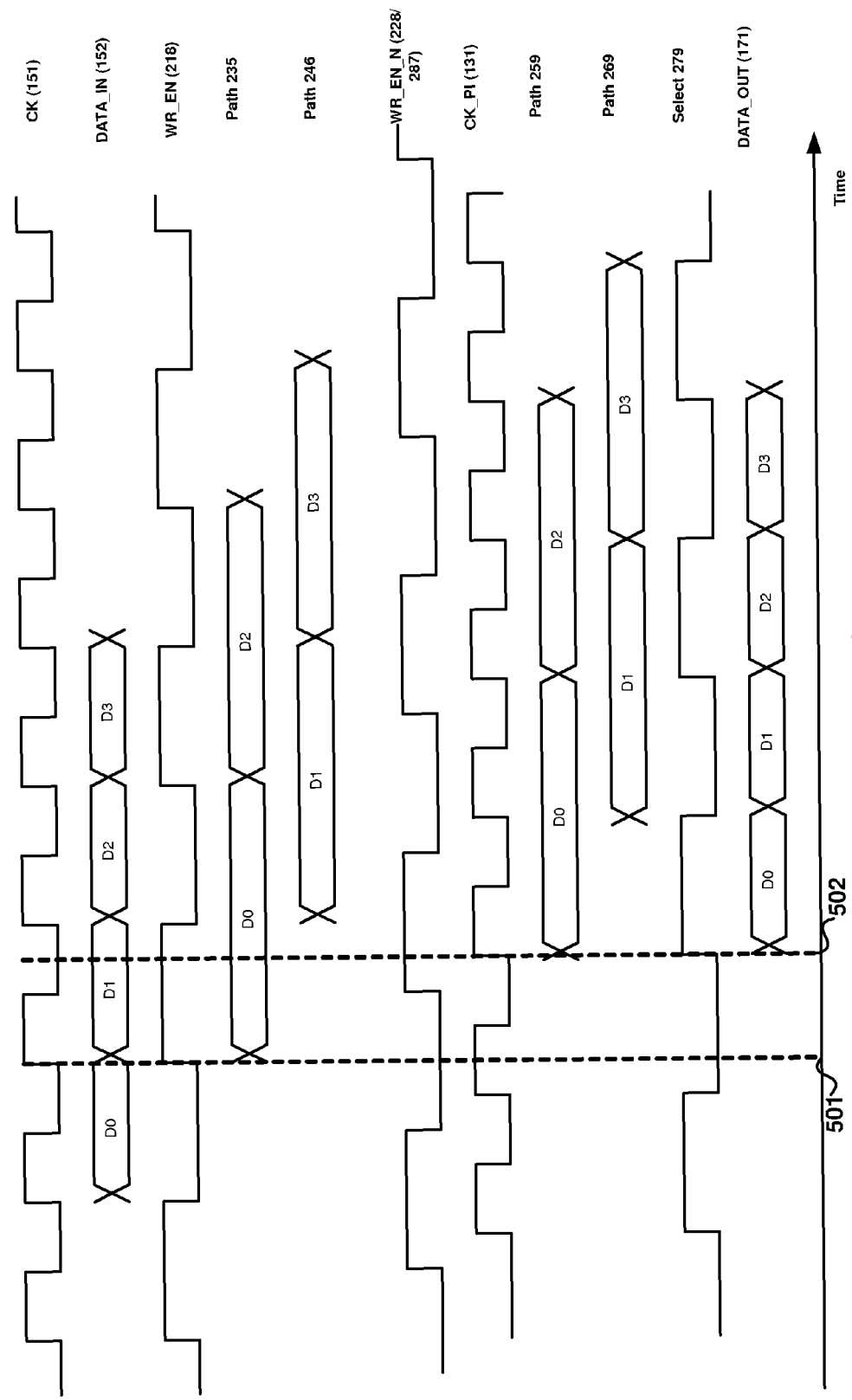
FIG. 5 is a timing diagram illustrating the manner in which 0.5 period of delay is generated using an alternative technique.

FIG. 5 is a timing diagram illustrating the timing relationship of various signals when the desired delay magnitude equals 0.5 periods (corresponding to an actual delay period of 0.75 Period shown by time instances 501 and 502 of the input clock 151). In this scenario, control unit 140 causes a clock signal with a phase delay of 0.75 (compared to input clock signal 151) to be selected, while asserting path 141 to 1. As path 141 is asserted to 1, flop-flop 270 samples the signal on path 228.

As may be readily observed (ignoring the 0.25 Period set up time for simplicity), flip-flop 270 operates to select which rising edge of 131 to send to multiplexor 290—the rising edge located somewhere between actual delays 0 and 1.0 (when 141 is 0), or the rising edge located somewhere between actual delays 0.5 and 1.5 (when 141 is 1). In case of a clock delay of 0.75 Period, clock delay can be done either way, with 141 as 0 or 1, as is illustrated in FIGS. 4 and 5.

Figure 6:
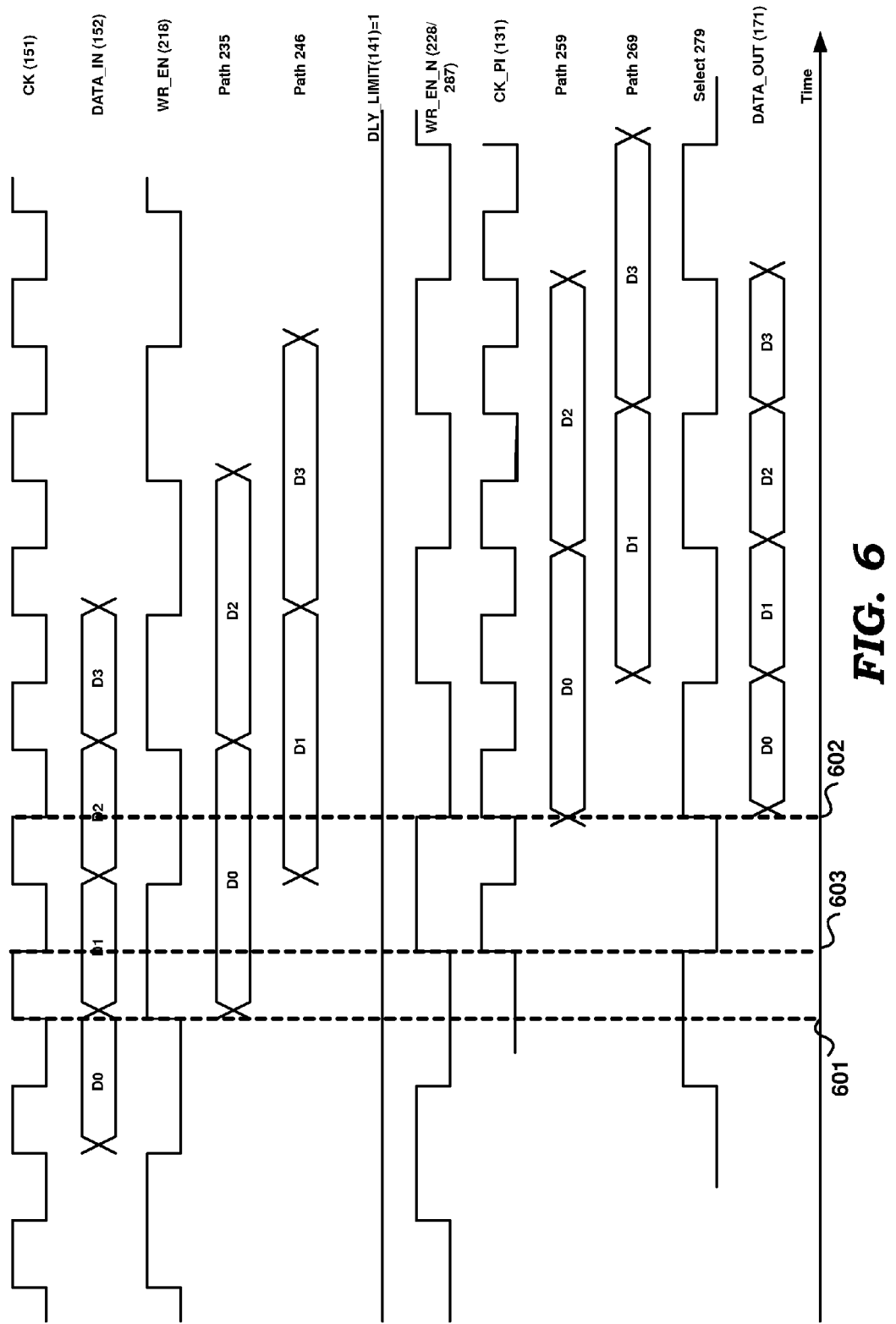
FIG. 6 is a timing diagram illustrating the manner in which 1.25 period of delay is generated in an embodiment.

FIG. 6 is a timing diagram illustrating the timing relationship of various signals when the desired delay magnitude equals 1.25 periods (corresponding to an actual delay period of 1.5 period, as shown by time instances 601 and 602 of the input clock 151). In this scenario, control unit 140 causes a clock signal with a phase delay of 0.5 (compared to input clock signal 151) to be selected, while asserting path 141 to 1. As path 141 is asserted to 1, flip-flop 270 samples the signal on path 228.

As may be appreciated by examining the timing diagram of FIG. 6, when the desired delay is more than 1, path 141 is asserted to 1. However, the assertion to 1 operates to provide a delay of 1 period only when the relative delay (of signal 131 compared to signal 151) is less than 0.5. Accordingly, control unit 140 can assert corresponding signals to obtain a desired delay in the range of 0 to 1.25 period of the input clock signal, as illustrated above.

It may be appreciated that the circuit of FIG. 1 provides several possible delay values (at a high resolution) due to the presence of value on path 141, clock selection circuit and fine tuning circuit, and thus offers a wide span of delays. In particular, the resolution is enhanced due to the operation of fine tuning circuit 150. Delays of over one clock period can be obtained with such precision due to the operation of synchronization unit 110.

Jitter is also minimized while providing such wide span since the clock signals are obtained directly from the PLL and only a small number of gates/components may be needed to implement the synchronization circuit. Furthermore, the delay obtained is (substantially) PVT invariant since the various timings are determined by the timing of clock signals (which are PVT invariant).

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A programmable delay circuit to delay a first digital value by a delay magnitude, said programmable delay circuit comprising:
 a phase lock loop (PLL) operable to generate a plurality of clock signals, wherein each clock signal within said plurality of clock signals has a same frequency and a different relative phase;
 a clock selection block operable to select one of a said plurality of clock signals as a selected signal;
 a synchronization circuit operable to provide said first digital value synchronized with an edge of said selected signal, wherein said first digital value comprises a sequence of digital values received according to an input clock signal and wherein said synchronization circuit comprises a first pair of sequential circuits, each operable to store alternate values of said sequence of digital values, and wherein said synchronization circuit comprises a second pair of sequential circuits, each operable to receive a digital value stored by one of said first pair of sequential circuits, associated therewith, using said selected signal; and
 a control unit operable to cause said clock selection block to select one of said plurality of clock signals based on said delay magnitude.

2. The programmable delay circuit of claim 1, wherein said input clock signal having said same frequency, wherein said control unit is further operable to cause each of said sequence of digital values to be delayed by said delay magnitude.

3. The programmable delay circuit of claim 2, wherein said first-pair of sequential circuits is operable to store said alternate values of said sequence of digital values at time instances based on said input clock signal and said synchronization circuit comprises: and
 a first multiplexor operable to select the digital value stored by one of said second pair of sequential circuits and operable to provide as the delayed digital value according to a select value, wherein said select value alternates between a first digital value and a second digital value in successive clock cycles of said selected signal.

4. The programmable delay circuit of claim 3, wherein said synchronization circuit further comprises:
 a second sequential circuit clocked by said selected signal and operable to pass a corresponding sample on a write enable signal as said select value to said first multiplexor, wherein a frequency associated with said write enable signal is half the frequency of said input clock signal.

5. The programmable delay circuit of claim 4, wherein said write enable signal has a phase difference of a first magnitude compared to said input clock signal when said delay magnitude is in a first range and of a second magnitude when said delay magnitude is in a second range, wherein said first magnitude is different from said second magnitude.

6. The programmable delay circuit of claim 5, wherein said input clock signal has a period, wherein said first magnitude is 0 when said delay magnitude is less than 0.50 times said period and is half of said period when said delay magnitude is more than 0.75 times said period.

7. The programmable delay circuit of claim 5, wherein said synchronization circuit further comprises:
 a third sequential circuit clocked by said input clock signal, comprising an inverted output coupled to input data, wherein an output of said third sequential circuit is coupled to an enable input of one of said first pair of sequential circuits, and wherein said inverted output of said third sequential circuit is coupled to an enable input of the other one of said first pair of sequential circuits;
 a fourth sequential circuit clocked by an invert of said input clock signal and operable to receive an output from said third sequential circuits as a data input; and
 a second multiplexor operable to select an output of one of said third sequential circuit and said fourth sequential circuit according to a second select value to provide said write enable signal, wherein said control unit asserts said second select value to a first value when said delay magnitude is less than or equal to half of said period and to a second value when said delay magnitude is greater than said period, wherein said first value of said second select signal causes the second multiplexor to select the output of said third sequential circuit and said second value of said second select signal causes the second multiplexor to select the output of said fourth sequential circuit.

8. The programmable delay circuit of claim 2, wherein said delay magnitude is in a range of 0 times to (1.5–X) times said period, wherein X represents the minimum delay between said input clock signal and said selected clock signal.

9. The programmable delay circuit of claim 1, further comprising:
a finer delay block operable to delay said selected signal by a magnitude less than the minimum phase difference of the relative phases of said plurality of clock signals and operable to provide the delayed signal as said selected signal to said synchronization circuit.

10. The programmable delay circuit of claim 1, wherein said clock selection block is a multiplexor.

11. The programmable delay circuit of claim 1, wherein said synchronization circuit operates an asynchronous first in first out device.

12. A programmable delay circuit to delay a first digital value by a delay magnitude, said programmable delay circuit comprising:
means for forming a plurality of clock signals having a same frequency and different relative phases, wherein said plurality of clock signals are substantially invariant to variations in process, voltage and temperature;
means for selecting one of said plurality of clock signals as a selected signal based on said delay magnitude; and
means for providing said first digital value synchronized with an edge of said selected signal, wherein said first digital value comprises a sequence of digital values received according to an edge of an input clock signal and wherein said means for providing said first digital value comprises a pair of sequential circuits operable to store alternate values of said sequence of digital values, and wherein said means for providing said first digital value comprises a second pair of sequential circuits, each operable to receive a digital value stored by one of said first pair of sequential circuits, associated therewith, using said selected signal.

13. The programmable delay circuit of claim 12, wherein said input clock signal having said same frequency, wherein said relative phases are with respect to said edge.

14. The programmable delay circuit of claim 13, further comprising:
means for providing a finer delay for said selected signal, wherein a magnitude of said finer delay is less than the minimum phase difference of the relative phases of said plurality of clock signals.

15. The programmable delay circuit of claim 12, wherein said delay magnitude is greater than a minimum set up time required for operation of a plurality of memory elements performing said providing.

16. A method of delaying a first digital value by a delay magnitude, said method comprising:
forming a plurality of clock signals having a same frequency and different relative phases, wherein said plurality of clock signals are substantially invariant to variations in process, voltage and temperature;
selecting one of said plurality of clock signals as a selected signal based on said delay magnitude; and
providing said first digital value synchronized with an edge of said selected signal, wherein said first digital value comprises a sequence of digital values received according to edges of an input clock signal and wherein a first pair of sequential circuits is used to store alternate values of said sequence of digital values, and wherein each of a second pair of sequential circuits is used to receive a digital value stored by one of said first pair of sequential circuits, associated therewith, using said selected signal.

17. The method of claim 16, wherein said input clock signal having said same frequency, wherein said relative phases are with respect to a phase of said edges.

18. The method of claim 17, wherein said delay magnitude is in a range of 0 times to (1.5–X) times said period, wherein X represents the minimum delay between said input clock signal and said selected clock signal.

19. The method of claim 16, wherein said delay magnitude is greater than a minimum set up time required for operation of a plurality of memory elements performing said providing.

20. The method of claim 16 further comprising:
providing a finer delay for said selected signal, wherein a magnitude of said finer delay is less than the minimum phase difference of the relative phases of said plurality of clock signals.

* * * * *